No. 620,969. Patented Mar. 14, 1899.
G. ROBERTS.
SHUTTER.
(Application filed Nov. 26, 1897.)
(No Model.) 2 Sheets—Sheet 2.
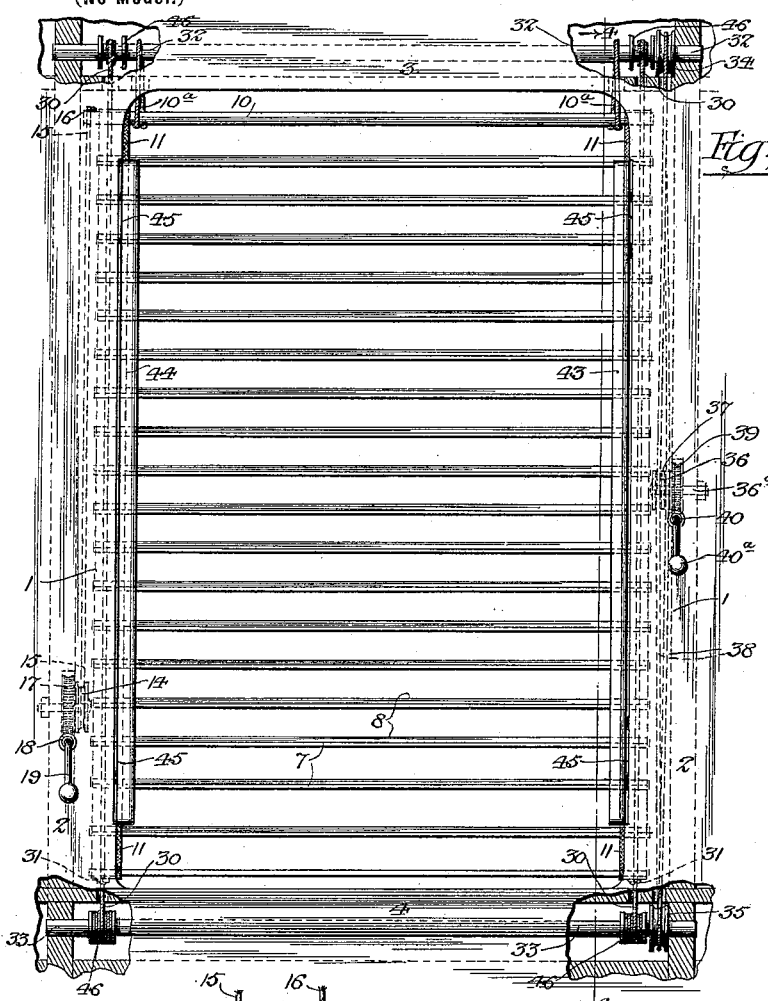
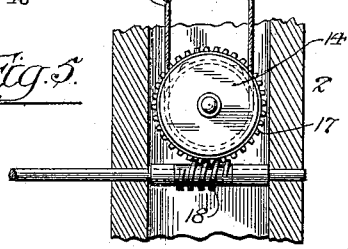
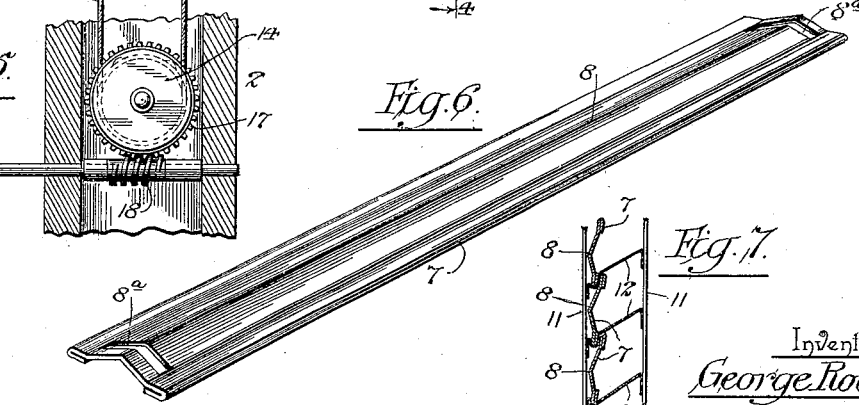
Witnesses:
Louis M. T. Whitehead
H. E. Bernhard
Inventor:
George Roberts
By his Attorneys,
C. A. Snow & Co.

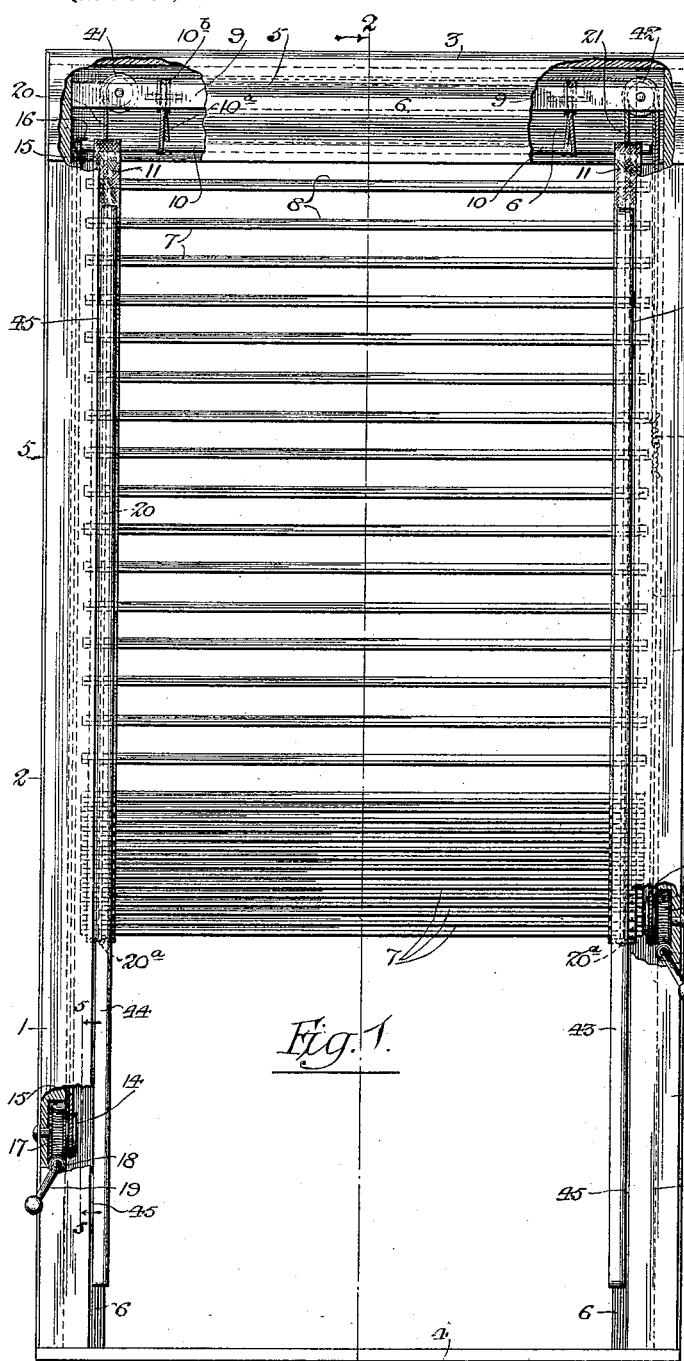

UNITED STATES PATENT OFFICE.

GEORGE ROBERTS, OF WHEELING, WEST VIRGINIA.

SHUTTER.

SPECIFICATION forming part of Letters Patent No. 620,969, dated March 14, 1899.

Application filed November 26, 1897. Serial No. 659,867. (No model.)

*To all whom it may concern:*

Be it known that I, GEORGE ROBERTS, a citizen of the United States, residing at Wheeling, in the county of Ohio and State of West Virginia, have invented a new and useful Shutter, of which the following is a specification.

This invention relates to improvements in flexible shutters adapted for use in connection with the windows of buildings as well as in the windows of railway-cars; and the object that I have in view is to provide a simple and inexpensive structure adapted to be raised or lowered and to have its slats or members tilted to their closed and open positions by independent operating devices which are readily accessible from the inside of the room or apartment, whereby the shutter may be adjusted as desired with ease from the inside of the room or car and the necessity for opening the window to adjust the shutter is wholly obviated.

A further object that I have in view is to provide novel means for raising or lowering the shutter and for tilting its slats, which adjusting devices are wholly independent the one from the other and are adapted to serve as locking devices to retain the shutter in any position to which it may be adjusted.

A further object that I have in view is to provide in connection with a car-window shutter a novel means for operating the same and said means having its parts so arranged as to produce the desired and proper tension on a traveling belt or band which is guided to have its strands out of contact with each other at the points where they cross to reduce chafing and wear to a minimum.

A further object that I have in view is to provide means for use in connection with the flexible shutter adapted to force the slats thereof tightly against the shutter-casing and against each other for the purpose of forming a continuous unbroken metallic surface adapted to serve as a fire-shield.

With these ends in view my invention consists in the novel construction, combination, and arrangement of parts, which will be hereinafter fully described and claimed.

To enable others to understand my invention, I have illustrated the preferred embodiment thereof in the accompanying drawings, forming a part of this specification, and in which—

Figure 1 is an elevation, partly in section, of a flexible shutter embodying my invention and adapted for use in connection with an ordinary window. Fig. 2 is a vertical longitudinal sectional view on the plane indicated by the dotted line 2 2 of Fig. 1, looking in the direction indicated by the arrow and showing by dotted lines the position of the window-frame and ordinary sashes. Fig. 3 is an elevation, partly in section, illustrating my improved shutter applied to a window of a railway-car. Fig. 4 is a vertical transverse sectional view of the car-window shutter on the plane indicated by the dotted line 4 4 of Fig. 3. Fig. 5 is a detail sectional elevation on the plane indicated by the dotted line 5 5 of Fig. 1 to show the mechanism for tilting the slats or members of the flexible shutter. Fig. 6 is a detail perspective view of one of the shutter-slats detached from its flexible suspending and adjusting bands or tapes. Fig. 7 is a fragmentary detail sectional view illustrating a series of three slats of the flexible shutter and showing the said slats in their closed lapped positions adapted to present the continuous unbroken metallic surface when the device is to be used as a fire-shield.

Like numerals of reference denote like and corresponding parts in each of the several figures of the drawings.

In Figs. 1 and 2 of the drawings I have illustrated my flexible shutter applied to an ordinary window-casing, and I will first proceed to describe this embodiment of the invention and afterward describe the invention as applied to a car-window. (Illustrated by Figs. 3 and 4 of the drawings.)

Referring now more particularly to Figs. 1, 2, 5, 6, and 7, the numeral 1 denotes a casing for the flexible shutter. This casing consists of the side pieces 2 2, a cap-rail 3, and a sill-piece 4, all united together in any suitable manner to present a substantially rigid structure of dimensions and form to fit within the projecting parts of an ordinary window frame or casing, substantially as shown by Fig. 2 of the drawings. This shutter-frame is auxiliary to the window casing or frame and is adapted to be applied outside of the ordinary sashes in the window, said shutter-frame being secured in place by screws or other suitable fastenings, so as to occupy a rigid fixed position within the window-frame. The shutter-casing is further provided with a metallic sheath or covering 5, which is secured in a suitable way to the exposed edges of its side pieces, the cap-rail, and the sill to afford protection to said shutter-frame against deterioration by the action of the weather thereon, as well as to prevent its destruction by heat in the event of a fire. This metallic sheath or covering projects inwardly within the edges of the sides and cap-rail of the shutter-frame to form a marginal flange 6, against which the slats or members of the flexible shutter are adapted to impinge when said slats or members are canted or tilted to have the edges thereof overlap each other in the manner represented by Fig. 7.

Within the shutter-frame 1 and between the depending flanges 6 of the metallic sheath 5 at the head of the structure is arranged a suspension-rail 9, which is fixed to said frame or casing in any suitable manner. Arranged beneath this fixed suspension-rail is a tiltable plate 10, which is loosely or movably hung beneath said fixed suspension-rail to occupy a horizontal position substantially parallel thereto, but which is adapted to be vibrated in a vertical direction to assume different angular relations to said fixed rail. The means for hanging the tiltable plate consists of cords $10^a$ and pulleys or sheaves $10^b$. The sheaves are fitted in suitable slots or mortises in the fixed suspension-rail 9 and loosely mounted on suitable pins or arbors, as shown by Figs. 1 and 2, and the cords $10^a$ pass loosely over the sheaves and have their respective ends carried around opposite edges of the tiltable plate 10, the ends of said cords being suitably fastened to the tiltable plate.

The shutter consists of a series or multiplicity of metallic slats 7, occupying horizontal positions across and within the shutter-frame 1, the ends of said slats terminating within the vertical faces of the side rails 2 of the shutter-frame and within the marginal flange 6 of the metallic sheath or covering 5, whereby the shutter-slats are confined or housed loosely within the fixed frame 1. Each slat is made from a single piece of sheet metal, which is creased or bent longitudinally along the middle thereof to form a crest or ridge 8, and the side edges of each slat are doubled or folded in order to strengthen the slat. Each slat is furthermore provided near its ends with the transverse slots $8^a$, which terminate within the doubled or folded edges thereof to provide for the passage through the slats of the cords, presently described, for raising and lowering the slats, according as it is desired to open or close the shutter. The series of slats are attached to the suspension tapes or bands 11 of a suitable flexible material and arranged on opposite sides of the slats, the upper ends of the tapes or bands being suitably secured to the tiltable plate 10, and the movement or play of these flexible suspension tapes or bands laterally with relation to each other is arrested by the stop-strips 12, suitably fastened to the opposing faces of said suspension tapes or bands, substantially as shown by Fig. 7.

As is usual in this class of shutters, the flexibly-connected slats are adapted to be tilted or canted for the purpose of opening or closing the same to admit more or less light through the shutter, and said shutter-slats are designed to be raised or lowered more or less, as shown by Fig. 1, to afford an unobstructed view through the window.

The means for tilting or canting the slats consists in the flexible bands or tapes 11, heretofore described, in connection with a pulley 14, cords 15 16, a worm-wheel 17, a worm-gear 18, and a crank 19. The worm-wheel 17 is journaled on a suitable pin or shaft attached to one of the side rails of the shutter-frame, at a point near the lower part thereof, and to this worm-gear or a pulley thereon are fastened the lower ends of the operating-cords 15 16, one cord being attached to the worm-wheel or pulley on one side thereof, while the other cord thereof is fastened to said worm-wheel or its pulley on the opposite side. These cords 15 16 extend vertically within the shutter-frame and the marginal flanges 6 of its metallic cover or sheath, and the upper ends of said cords 15 16 are fastened to opposite side edges of the tiltable plate 10, so that as the worm-gear and its pulley are rocked or turned in one direction the cord 15 will pull on one side of the tiltable plate and the cord 16 will yield or give sufficiently to accommodate the tilting movement of the plate 10 under the pulling strain of the cord 15, and vice versa. As the worm-wheel and its pulley are rocked in an opposite direction to pull on the cord 16 the cord 15 will yield or give sufficiently to allow the cord 16 to tilt the suspended plate 10 in an opposite direction, whereby the suspended tiltable plate 10 shifts the positions of the flexible tapes or bands 11 and changes the angular positions of the shutter-slats as may be desired.

The worm 18 is carried on an elongated shaft which passes through the shutter-frame 1 and through a suitable opening provided in the ordinary window-frame, substantially as shown by Fig. 2 of the drawings, and this worm-shaft is journaled in suitable bearings, (not shown,) and it is provided at its inner end with the crank-handle 19, situated within the room or apartment, so as to be readily accessible for the purpose of moving the mechanism which tilts the shutter-slats 7.

I attach importance to the employment of the worm-gearing as a means for actuating the mechanism by which the shutter-slats are tilted because such form of gearing serves as a means for locking or holding the slats of the shutter in the positions to which they may be adjusted, and by the described construction and arrangement of parts I provide an operating mechanism that enables the shutter-slats to be turned to horizontal, vertically-inclined, or vertical positions, so that the slats may be opened more or less to admit light and air, or they may be closed to have the edges thereof overlap each other, as will be readily understood.

The mechanism for raising and lowering the shutter-slats consists of the elevating-cords 20 21, which pass through the slots in the slats 7 and are provided at their lower ends with suitable stops 20ª, adapted to abut against the lowermost slat of the series of slats forming the shutter. The cord 20 passes through a slot or mortise provided in the fixed suspension-rail and over a loose guide-sheave 41. Thence it passes along the upper side of the fixed suspension-rail and over a double guide-sheave 42, also journaled in said fixed suspension-rail. The cord 21 passes over one member or part of the last-named guide-sheave 42, and at a suitable distance below this guide-sheave 42 the cords 20 21 are joined together, as at 21ª, and attached to a single pull-cord 24. The operating-cords 20, 21, and 21ª are thus arranged to occupy for a part of their length one side of the shutter-frame, along which said cords extend down to a worm-gear 26, provided with a pulley 25. This worm-gear and pulley are journaled on a suitable pin or arbor 23, which is fixed in one side of the casing or frame for the shutter at a suitable elevation. With the worm-gear 26 meshes a worm on the elongated worm-shaft 27, which extends through one side of the shutter-frame and through a suitable opening in the window frame or casing, the inner end of said worm-shaft being provided with an operating-crank 28, readily accessible from the inside of a room or apartment. By turning the worm-shaft 27 in one direction the worm-gear and its pulley will be actuated to wind the cord 24 thereon, and thus draw on the running cords 20 21 to elevate the slats, substantially as shown by Fig. 1; but by turning the worm-shaft in the reverse direction the cord 24 will be uncoiled from the pulley of the worm-gear and the cords 20 21 thus slackened to allow the slats of the shutter to descend by gravity, the slats opening or separating automatically within the limits permitted by the stop-bands 12 in a manner usual to shutters of this class.

As in the described mechanism for canting or tilting the slats of the shutter, the worm-gear and its shaft for the mechanism for raising and lowering the shutter serve as the means for locking the shutter in its raised or partially-raised condition, thus dispensing with the necessity for separate locking contrivances for holding the shutter to its adjusted position.

My improved shutter, consisting of the metallic slats adapted to be canted or tilted to positions where the edges of the slats overlap one another, is especially adapted to form a fire-shield to prevent the ingress of flames into or their egress from a room or apartment, and in this connection I will describe a means whereby the slats may be locked rigidly in their tilted overlapped positions for the purpose of presenting the continuous unbroken metallic surface. The means for locking said slats rigidly in place consists of the locking-rails 43 44, arranged in vertical positions on opposite sides of and within the shutter-frame 1. These locking-rails are situated adjacent to the shutter-slats, and they are attached adjustably to the shutter-frame by means of the links 45. (Shown by dotted lines in Fig. 2.) A pair of these links 45 is provided for each locking-rail, one link being arranged near the upper end of the shutter-frame and the other link near the lower end of said shutter-frame, and each link has one end pivoted to the shutter-frame and its other end pivoted to the locking-rail, whereby the links are adapted to fold with the locking-rail when it is retracted away from the path of the shutter-slats, and as said rail is forced inwardly beyond the shutter-slats the links are extended or drawn out to sustain the locking-rail in fixed position. When it is desired to lock or fasten the shutter, so that access cannot be obtained from the outside to the window-sashes, the shutter is lowered to its full limit and the slats thereof are tilted or canted to have their edges overlap one another, the lower slat of the series resting upon the sill 4 and the upper slat against the flange 6 on the outside of the shutter-frame. After the shutter has been adjusted as described the locking-rails are forced outwardly so that their front edges come in contact with the overlapping slats of the shutter, and said locking-rails are thus adapted to force the slats tightly into engagement with each other and with the shutter-frame, and the rails thus are maintained in their adjusted locked positions by the foldable extensible links 45. The flexible shutter is thus well adapted to form a fire-shield, because its slats present the continuous unbroken metallic surface, and as the means for locking the slats in their adjusted positions are arranged within the shutter-frame the shutter thus affords protection against unwarranted persons having access to the window-sashes.

In the embodiment of my invention in a car-window substantially as shown by Figs. 3 and 4 I dispense with the shutter-frame and its metallic sheath or cover, in lieu of which a part of the car-frame is utilized as the means for housing the flexible shutter. As in the construction heretofore described I employ the metallic slats forming the shutter, the flexible suspension bands or tapes, the stop-bands, the tiltable suspension-plate, and the operating devices for adjusting the shutter-slats to their tilted positions and for raising and lowering the slats bodily across the window-opening; but the mechanism for raising and lowering the shutter is modified somewhat in construction, as I will now proceed to describe. Within the car-frame, or a panel thereof, is arranged an upper roller 32, and below the sill of the window is a lower roller 33. These rollers occupy horizontal positions substantially parallel to each other, and they are provided with suitable drums or pulleys 46. The running-cords 30 pass through the slots in the shutter-slats, and the upper ends of said running-cords are coiled on the pulleys or drums of the roller 32, while the lower ends of said running-cords 30 are coiled on the drums or pulleys of the lower roller 33, whereby as one roller is rotated to take up the cords 30 the other roller will be rotated to allow the other ends of the cords 30 to unwind therefrom. These running-cords 30 are provided at points intermediate of their length with rests 31, which are formed by knotting the cords at points for the lower slat to rest on said knots. At one end of the upper roller 32 is affixed a pulley 34, and the lower roller 33 is provided with a similar pulley 35, said pulleys 34 35 occupying the same vertical plane at one side of the window-opening. Intermediate between these upper and lower pulleys 34 35 is arranged an operating-pulley 36, which is journaled on a suitable pin or arbor 36$^a$, fastened to the window frame or casing at a suitable height above the sill thereof. This operating-pulley 36 is rigid with a worm-gear 39, with which meshes a worm on the shaft 40, arranged transversely in the window-frame and provided at its inner end with a suitable operating-crank 40$^a$. The pulleys 34, 35, and 36 are operatively connected together by an endless band or belt 38, which is designed to be driven by its frictional engagement with the intermediate pulley 36 and engages, with the pulleys 34 35, with the upper and lower rollers in a manner to impart rotary motion to said rollers in opposite directions simultaneously, whereby said rollers 32 33 are driven in a manner to coil the running-cords 30 on one roller as said cords are uncoiled from the other roller. The pulley 36 has a central ridge 37, which forms, in connection with the end flanges on said pulley, the two grooves to receive the respective strands of the endless belt 38 and to guide the belt-strands in a manner to keep them from chafing. The belt has its strands passed around the pulleys 34, 35, and 36 in a manner shown by Fig. 4, so that the belt-strands are doubly crossed, one crossing of the belt-strands being between the pulleys 34 and 36 and the other crossing of said belt-strands being between the pulleys 35 and 36. The described arrangement of the belt with relation to the three pulleys enables good frictional contact to be obtained between the belt and each of its pulleys, so as to reduce slipping of the belt on the pulleys to a minimum, and in this connection it is to be observed that the intermediate pulley 36 serves as the means for driving the belt, as a tension device to maintain the belt taut, and as a guide to the belt to prevent it from rubbing together and chafing.

As in the shutter for use in ordinary windows the slats forming the shutter for the car-window may be tilted or canted by operating a worm-shaft on one side of the window-opening, or the shutter may be raised or lowered by operating the worm-shaft 40 on the opposite side of the window-opening, and both of these worm-shafts are provided with crank-shafts readily accessible from the inside of the car, so that the shutter may be adjusted, as desired, without opening the window.

In lieu of the cords hereinbefore described as forming the operative connections between the several working parts of the shutter I may use wires, chains, or cables.

It is thought that the operation and advantages of my improved shutter will be readily understood from the foregoing description, taken in connection with the drawings.

It is evident that slight changes in the form and proportion of parts and in the details of construction may be resorted to without departing from the spirit or sacrificing any of the advantages of the invention, and I therefore reserve the right to make such changes and alterations as come within the scope of the invention.

Having thus described the invention, what I claim as new, and desire to secure by Letters Patent, is—

1. The combination with a shutter-frame, and a flexible shutter within said frame, of the independent worm-shafts journaled in opposite sides of said frame, a tiltable plate suspended within the frame and operatively connected with the flexible shutter to suspend the latter, a worm-gear meshing with one of said shafts and actuating-cords which are attached to the tiltable plate to shift the position of the latter, another worm-gear meshing with the other worm-shaft, and elevating-cords actuated by the last-named worm-gear and operatively connected with the flexible shutter to raise or lower the same, whereby the shutter may be tilted and adjusted vertically by independent worm-actuated devices that serve to hold their respective parts in the positions to which they may be adjusted, substantially as described.

2. The combination with a shutter-frame, and a flexible shutter therein, of the independent worm-shafts journaled in opposite sides of said frame and projecting from the inner face thereof, a tiltable plate suspended within the frame and connected by bands to the slats of said shutter, a worm-gear meshing with one of said worm-shafts, cords attached to opposite sides of the worm-gear and tiltable plate to cant the latter on a semirotation of said gear, another worm-gear meshing with the other worm-shaft, and elevating-cords actuated by the last-named worm-gear and operatively connected with the shutter to raise or lower the latter from one of the worm gears and shafts, for the purposes described, substantially as set forth.

3. A flexible shutter comprising a series of metallic bent slats each having a central crest and transverse slots near the ends thereof, suspending-tapes connected to the individual slats at their opposite edges, and limiting-straps united to said tapes, combined with a tiltable plate to which the shutter-tapes are attached, independent worm-shafts arranged on opposite sides of the shutter and each actuating worm-gear, operating-cords attached to one of said worm-gears and the tiltable plate, and elevating-cords passing through said slots in the shutter-slats and actuated from the other worm-gear and worm-shaft, substantially as described.

4. The combination with an ordinary window-casing, of an auxiliary shutter-frame fixed within the window-frame outside of the sashes, a flexible shutter suspended within the shutter-frame, means operatively connected with the shutter to tilt or cant the slats thereof and including a shaft which extends through the window-casing, and a raising and lowering mechanism also operatively connected with the flexible shutter and including a shaft which extends through the window-casing, whereby the shafts of the tilting and raising mechanisms are accessible from the inside of the room or apartment, substantially as described.

5. A shutter-inclosing frame independent of an ordinary sash-frame and secured rigidly within an ordinary window, a metallic hood secured to said shutter-inclosing frame, and the guide-flanges arranged vertically within the shutter-frame, in combination with a flexible metallic shutter suspended within said frame and the guide-flanges thereof and arranged to have its slats overlap each other when tilted or canted, devices for adjusting the shutter to the tilted or canted positions and also vertically within said frame, and locking-rails connected to the sides of the frame and arranged to clamp the shutter-slats between the flanges of the frame and the locking-rails, substantially as described.

6. The combination with a shutter-frame having vertical flanges, and a flexible metallic shutter equipped with means for adjusting the slats thereof to tilted or canted positions, of vertical locking-rails connected to the frame opposite to the vertical flanges thereof and arranged to bind or press the shutter-slats firmly against said vertical flanges and thereby close the spaces between the slats to make the shutter present a substantially unbroken or continuous surface, as and for the purposes described.

7. The combination with a shutter-frame, of a flexible suspended shutter therein, means for tilting the slats of the shutter to overlap each other, and independent locking-rails which are carried by a pair of pivoted links and adapted to be projected into contact with the slats of the flexible shutter whereby said locking-rails are adapted to force the slats into intimate contact with each other and present a continuous metallic surface, substantially as and for the purposes described.

8. The combination of a shutter-frame, a metallic sheath or cover therefor forming an inwardly-extending marginal flange, a flexible shutter having its individual slats bent longitudinally to form central ridges and adapted to have their edges overlap one another, the vertical locking-rails arranged within the shutter-frame, and links pivoted to the shutter-frame and to the locking-rails to support said rails out of the path of the shutter-slats and to project the rails into fixed engagement with said shutter-slats when the latter are tilted to overlap each other, substantially as and for the purposes described.

9. In a flexible shutter, the combination of rollers arranged at the top and bottom of the frame or casing, running-cords coiled on said rollers, a tiltable plate, a continuous series of metallic slats suspended from the tiltable plate and with the lowermost slat of the series connected with said running-cords, means for operating the rollers to raise and lower the shutter-slats, and an adjusting device connected with the tiltable plate, substantially as described.

10. The combination of horizontal rollers journaled above and below a window-frame, the continuous running-cords coiled on said rollers, a tiltable plate suspended below the upper roller, a continuous series of metallic slats suspended from the tiltable plate and loosely fitted to the running-cords, pulleys fastened to the rollers substantially in vertical alinement with each other, a worm-gear having a pulley in the plane of the roller-pulleys, an endless band or belt connecting the worm-gear pulley and the roller-pulleys, a worm-shaft for actuating the worm-gear, and an independent adjusting device for the tiltable plate, substantially as described.

11. The combination with horizontal upper and lower rollers and a flexible shutter, of the pulleys attached to said rollers, an intermediate double pulley rigid with the worm-gear and having a central ridge, a double crossed belt or band connecting the roller-pulleys and the intermediate pulley and engaging with the latter to have its strands guided by the central ridge, and a worm-shaft meshing with the worm-gear of the intermediate pulley, substantially as and for the purposes described.

In testimony that I claim the foregoing as my own I have hereto affixed my signature in the presence or two witnesses.

GEORGE ROBERTS.

Witnesses:
JOHN H. SIGGERS,
HAROLD H. SIMMS.